(12) United States Patent
De Roquette Buisson et al.

(10) Patent No.: US 9,908,697 B2
(45) Date of Patent: Mar. 6, 2018

(54) METHOD, MOBILE ROBOT AND SYSTEM FOR THE AUTOMATED MANAGEMENT OF A SELF-STORAGE SITE

(71) Applicant: KINGBOX, Toulouse (FR)

(72) Inventors: Nicolas De Roquette Buisson, Toulouse (FR); Matthieu Besozzi, Pibrac (FR)

(73) Assignee: KINGBOX, Toulouse (FR)

( * ) Notice: Subject to any disclaimer, the term of this patent is extended or adjusted under 35 U.S.C. 154(b) by 0 days.

(21) Appl. No.: 15/282,558

(22) Filed: Sep. 30, 2016

(65) Prior Publication Data
US 2017/0096300 A1 Apr. 6, 2017

(30) Foreign Application Priority Data
Oct. 2, 2015 (FR) ...................... 15 59401

(51) Int. Cl.
| G06F 7/00 | (2006.01) |
| B65G 1/04 | (2006.01) |
| H04L 29/08 | (2006.01) |
| G05D 1/00 | (2006.01) |
| G06Q 50/28 | (2012.01) |

(52) U.S. Cl.
CPC ......... *B65G 1/0492* (2013.01); *G05D 1/0022* (2013.01); *G06Q 50/28* (2013.01); *H04L 67/12* (2013.01)

(58) Field of Classification Search
USPC .......................................... 700/218
See application file for complete search history.

(56) References Cited

U.S. PATENT DOCUMENTS

| 5,946,660 A | * | 8/1999 | McCarty | .................... | E05G 1/08 |
| | | | | | 705/5 |
| 2002/0188457 A1 | * | 12/2002 | Jenkins | .................. | G06Q 10/02 |
| | | | | | 705/5 |
| 2005/0237149 A1 | * | 10/2005 | Loftin | ...................... | E05B 47/06 |
| | | | | | 340/5.42 |
| 2006/0206342 A1 | * | 9/2006 | Shoen | .................... | G06Q 10/02 |
| | | | | | 705/16 |
| 2014/0142757 A1 | * | 5/2014 | Ziegler | .................... | B25J 5/007 |
| | | | | | 700/255 |
| 2014/0350725 A1 | * | 11/2014 | LaFary | .................. | G06N 3/008 |
| | | | | | 700/253 |

* cited by examiner

*Primary Examiner* — Kyle O Logan
(74) *Attorney, Agent, or Firm* — Klein, O'Neill & Singh, LLP

(57) ABSTRACT

The invention relates to a mobile robot able to move inside a self-storage site comprising a plurality of outer walls defining said inside space and a plurality of storage boxes arranged in said inside space, said mobile robot comprising an entry module configured to allow a user to enter information relative to the location of a storage box, and a distributor of at least one locking means configured to lock said box once it is rented.

14 Claims, 3 Drawing Sheets

METHOD, MOBILE ROBOT AND SYSTEM FOR THE AUTOMATED MANAGEMENT OF A SELF-STORAGE SITE

FIELD OF ART

The present invention relates to the field of the management of self-storage sites, and more particularly relates to a method and a system for the automated management of a self-storage site. The invention in particular applies to the automated reception of new customers of a self-storage site.

BACKGROUND

At this time, it is known to store objects in a specialized warehouse called a self-storage site. Self-storage is intended both for individuals and professionals. It is in particular used by people who are moving or going abroad, students who need to store their belongings during vacations, people who wish to store seasonal goods or keep family heirlooms. It is also intended for individuals who do not have enough room to store all of their belongings in their homes. Companies may use it as a small warehouse where they can keep documents, computers, archives, hardware, tools, etc.

To that end and in a known manner, a self-storage site includes a plurality of partitioned compartments called "boxes" that may each be rented out to store items therein. The site is said to be "self-storage" because a customer having rented a box may, once he has entered the site, access his box personally and without human assistance from the lessor. In a known manner, the customer may enter the site by identifying himself to the receptionist or by identifying himself on an entry terminal that unlocks access to the site.

A potential customer wishing to rent a box to store belongings therein may wish to visit the self-storage site before signing the rental agreement. In this case, it is necessary to have a physical presence by the lessor on the site so that the latter can show the customer the different types of boxes, then, once the box is selected, have him sign the rental agreement.

Potential customers oftentimes visit the site spontaneously during highly variable hours, in particular during breakfast hours, evenings or on weekends. Consequently, to be able to receive them, it is desirable for the lessor to provide a physical presence on the site a large part of the time, for example 10 hours per day, 6 days per week, or 60 hours. However, the number of potential customers in a day may be very small, for example one or two potential customers per day, which represents a low actual visit time, for example about two hours, while requiring the human presence of at least one agent.

With the current solutions, it is therefore necessary to choose between mobilizing staff to receive potential customers during the broadest possible time windows for a very short actual work time, which presents a significant cost and therefore a major drawback, or losing potential customers, which is a major drawback.

There is therefore a need for a simple, reliable and effective solution for managing a self-storage site in particular making it possible to optimize costs while offering a high-quality service.

SUMMARY

To that end, the invention first relates to a mobile robot able to move inside a self-storage site comprising a plurality of outer walls defining said inside space and a plurality of storage boxes arranged in said inside space, said mobile robot comprising:
an entry module configured to allow a user to enter information relative to the location of a storage box, and
a distributor of at least one locking means configured to lock said box once it is rented.

The mobile robot according to the invention thus proposes a management solution for handling customer relations remotely that is adapted to the specificities of the self-storage industry. The mobile robot advantageously makes it possible to receive potential customers over wide time windows, which makes it possible to avoid systematic human presence to receive hypothetical customers and have them sign a rental agreement. The customers can thus visit the site and see the box that they will rent before signing the agreement without the presence of a customer service agent.

Preferably, the mobile robot comprises a communication module configured to communicate remotely with a manager of the self-storage site, in particular to allow the manager to command the mobile robot remotely or to sign a box rental agreement remotely with a potential customer.

In the latter case, the entry module is configured to send information, entered by the user, to the manager of the self-storage site via the communication module in order to allow the manager to sign said agreement.

According to one aspect of the invention, the mobile robot is configured to move in the inside space autonomously or by being controlled remotely via the communication module, for example by the manager or by a user.

Advantageously, the communication module is able to communicate over a first radio communication link with an outside access point to a first communication network, said outside access point, for example of the smartphone type, being arranged outside the self-storage site. This first communication link, for example of the UMTS or LTE type, may allow a user to interact directly with the mobile robot, for example to control it remotely.

Also advantageously, the communication module is able to communicate over a second radio communication link with an inside access point to a second communication network, said inside access point, for example of the Wi-Fi terminal type, being arranged in the self-storage site. The second communication link can in particular allow communication between the potential customer and the manager via the mobile robot.

Preferably, the mobile robot comprises a video acquisition module configured to capture a plurality of images of the inside space.

Also preferably, the video acquisition module is configured to send a plurality of acquired images to the manager of the self-storage site via the communication module, for example in order to steer the mobile robot remotely to allow a potential customer to visit the self-storage site.

The locking means assumes the form of a padlock, which is one inexpensive locking means that is easy to distribute to a customer and use to lock a self-storage box.

The invention also relates to an automated self-storage site, said self-storage site comprising:
a mobile robot as previously described,
a plurality of outer walls defining an inside space in which the mobile robot is able to move, and
a plurality of storage boxes arranged in said inside space, each box being able to be locked by a locking means distributed by the mobile robot.

Preferably, the self-storage site comprises an access portal to the inside space configured to be controlled remotely by a manager of the self-storage site in order to authorize the user to penetrate the inside space.

Also preferably, the secure access portal comprises a videophone mounted in the outside space of the site and that is configured to allow remote audiovisual communication between a user and the manager of the self-storage site in order to authorize said user to penetrate the site.

The invention also relates to an automated management system for a self-storage site, said system comprising a self-storage site as previously described and a management module for the self-storage site configured to communicate, via a communication link, with the mobile robot via the remote communication module, in particular to steer it remotely or to share information relative to the location of a box with a user located in the inside space of the self-storage site via the mobile robot.

Advantageously, the management module is configured to receive and display a plurality of images of the inside space acquired by the acquisition module.

According to one feature of the invention, the management module is configured to send the mobile robot a control message authorizing the mobile robot to distribute a locking means to a user.

The invention also relates to a method for renting a box of a self-storage site via a mobile robot as previously described, said site comprising a plurality of outer walls defining an inside space and a plurality of storage boxes arranged in said inside space, said method comprising:
- a step of entering information relative to a rental agreement for a box of the site via the entry module of the mobile robot,
- a step of distributing a locking means via the locking means distributor of the mobile robot once the agreement is signed,
- a step of locking the box using the distributed locking means.

Preferably, the mobile robot comprising a communication module configured to communicate remotely with a manager of the self-storage site, the method comprises a step of sending information, entered by the user via the entry module, to the manager of the self-storage site via said communication module, and a step of sending, by the manager, of a control message authorizing the mobile robot to distribute a locking means to a user once the agreement is signed.

Also preferably, the method comprises a step of guiding the user via the mobile robot in the inside space of the site in order to select a free box to be rented from among the plurality of boxes. Such guiding advantageously makes it possible to show the free boxes to the user so that the latter may choose the box to be rented and/or to monitor the user during his visit.

According to one aspect of the invention, the method further comprises a preliminary step of identifying a user via the access portal.

The invention also relates to a method for detecting an intrusion in a self-storage site via a mobile robot as previously described, said method comprising the following steps:
- receiving a message to trigger an alarm of a box of the self-storage site,
- moving the mobile robot in the inside space of the site up to said box,
- acquiring a plurality of images of the box,
- detecting an intrusion from the plurality of acquired images.

The security of the site is thus provided even without a human presence on the site.

Other features and advantages of the invention will appear in the following description done in reference to the appended figures, provided as non-limiting examples and in which identical references are given to similar objects.

DETAILED DESCRIPTION

Description of One Embodiment of the System According to the Invention

The system according to the invention allows the remote rental of a box in an automated self-storage site, in particular by allowing the site to be visited by a user and a rental agreement to be entered into remotely without the physical presence of the lessor on the site. Such remote management is in particular made possible by the use of a mobile robot.

I. System 1

Figure 1:
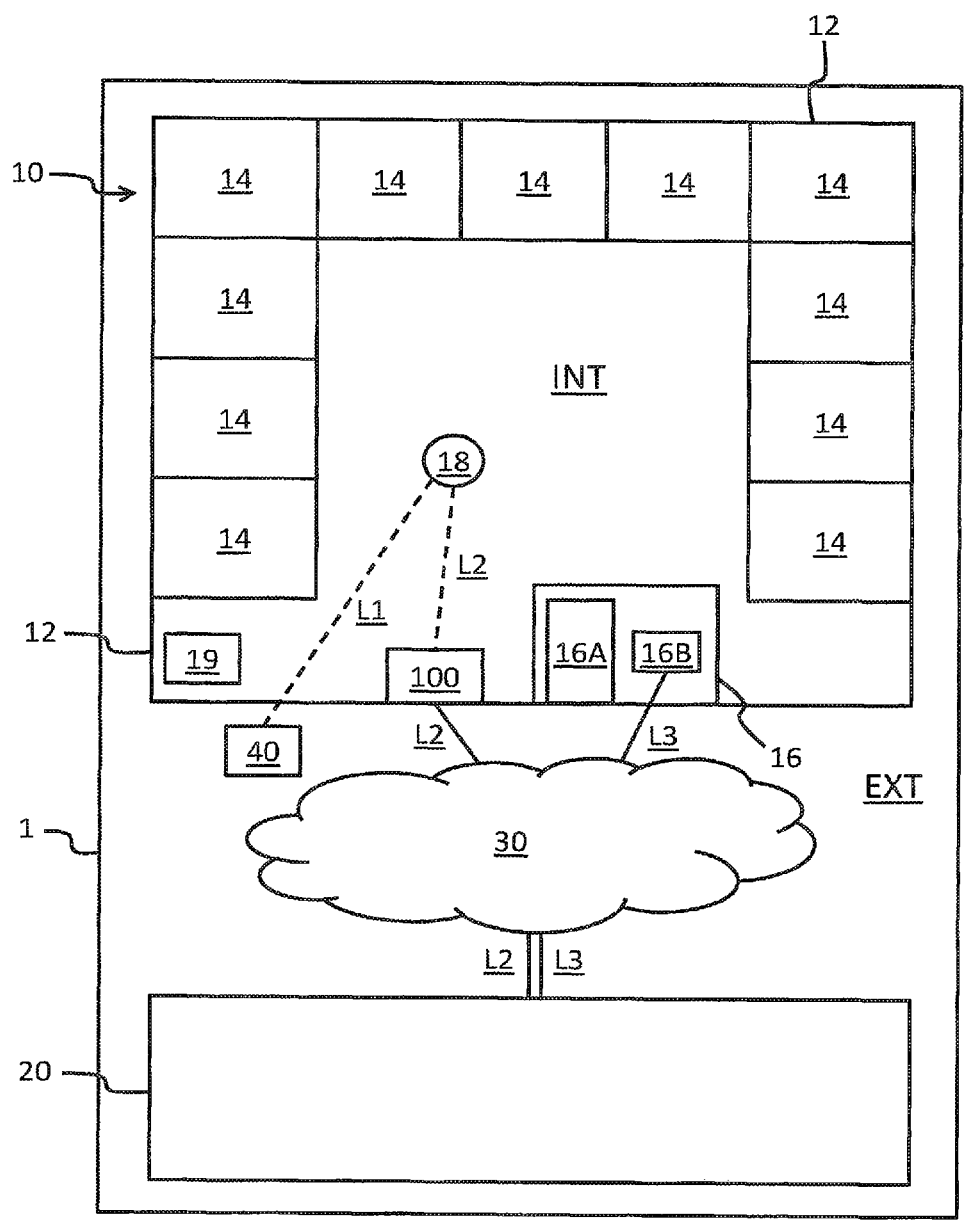
FIG. 1 diagrammatically illustrates an embodiment of the system according to the invention.

In reference to FIG. 1, the system 1 according to the invention comprises a self-storage site 10 and a management module 21 of said self-storage site 10. In this example, the management module 20 and the self-storage site 10 are connected by a communication network 30 and the system 1 (optionally) further comprises user equipment 40, for example of the smartphone type, able to communicate, over a first communication link L1, with the mobile robot 18 located in the site 10.

1) Self-Storage Site 10

A self-storage site includes a plurality of partitioned compartments called "boxes" that can each be rented to store items therein. The site is said to be "self-storage" because a customer having rented a box may, once he has entered the site, access his box personally and without human assistance from the lessor.

Still in reference to FIG. 1, the self-storage site 10 is located in an outside space EXT and comprises a plurality of outer walls 12 defining an inside space INT, a plurality of boxes 14 arranged in said inside space INT, a secure access portal 16 and a mobile robot 18.

In this preferred example, the site 10 further comprises a recharging base 19 for the mobile robot 18 and an internal access point 100 to the communication network 30.

The mobile robot 18 is able to communicate with the management module 20 over a second communication link L2 via the internal access point 100 and the communication network 30. The access portal 16 is able to communicate with the management module 20 via a third communication link L3 via the communication network 30.

The boxes 14 can be used to store items such as furniture, hardware, vehicles, archives, etc.

The arrangement and number of outer walls 12, boxes 14, access portals 16 and mobile robots 18 are in no case limiting with respect to the scope of the present invention, and of course the self-storage site can comprise more than one access portal 16 and more than one mobile robot 18.

a) Access Portal 16

The secure access portal 16 is arranged between the outside space EXT and the inside space INT of the self-storage site 10.

The access portal 16 is configured to be controlled remotely by a manager (not shown) of the self-storage site 10 via the management module 20 and via the third communication link L3 of the communication network 30 connecting said management module 20 to said access portal 16.

Still in reference to FIG. 1, the access portal 16 comprises a door 16A and a videophone 16B mounted at least partially in the outside space EXT so as to allow remote audiovisual communication between a user situated in the outside space EXT and a manager of the self-storage site 10 via the third communication link L3.

The videophone 16B makes it possible to interact with a user to identify and/or authenticate him in order to allow or deny him access to the inside space INT of the self-storage site 10.

To that end, the videophone 16B is preferably provided with a camera, a speaker, a microphone and a call initiation button (not shown) and is connected to the trigger of the door 16A of the self-storage site 10 in order to command unlocking thereof.

It will be noted that the access portal 16 can also comprise unlocking means of the door 16A, for example assuming the form of an electronic lock, allowing a user to have a code to unlock the door 16A so that he can enter the inside space INT of the self-storage site 10 without using the videophone 16B.

b) Mobile Robot 18

The mobile robot 18 is a remote presence robot in particular serving to manage the reception of the visitor once the latter has entered the inside space INT of the self-storage site 10. This may be a visitor coming to communicate with the manager via the videophone 16B or a visitor having penetrated the inside INT of the self-storage site 10 himself.

"Reception" means both receiving the visitor and guiding or accompanying him in the inside space INT of the self-storage site 10, in particular to show him the boxes 14, allow him to enter into a box rental agreement and disburse to him a locking means for a box 14 for which he has entered into a rental agreement.

To that end, the mobile robot 18 is able to move in the inside space INT of the self-storage site 10, for example autonomously or while being steered remotely by a manager via the management module 20 on the second communication link L2.

"Autonomous" means that the mobile robot 18 is programmed to move without being steered by a human person.

Still in reference to FIG. 1, the second communication link 20 between the mobile robot 18 and the management module 20 can traverse the communication network 30 between the management module 20 and the site 10, then consist of a radio link, for example of the Wi-Fi, Bluetooth® or Zigbee type, between an access point 100 of the site 10 and the mobile robot 18. The radio communication on the second communication link L2 can for example, in a known manner, be done using a protocol of the IP type.

The dimensions of the mobile robot 18 are chosen such that it can move in the inside space INT, in particular between the boxes 14.

In order to move, the mobile robot 18 can for example include a motor, an electric battery and wheels or tracks or any other known means (not shown). Such movement means of a robot being known, they will not be outlined in more detail here.

Figure 2:
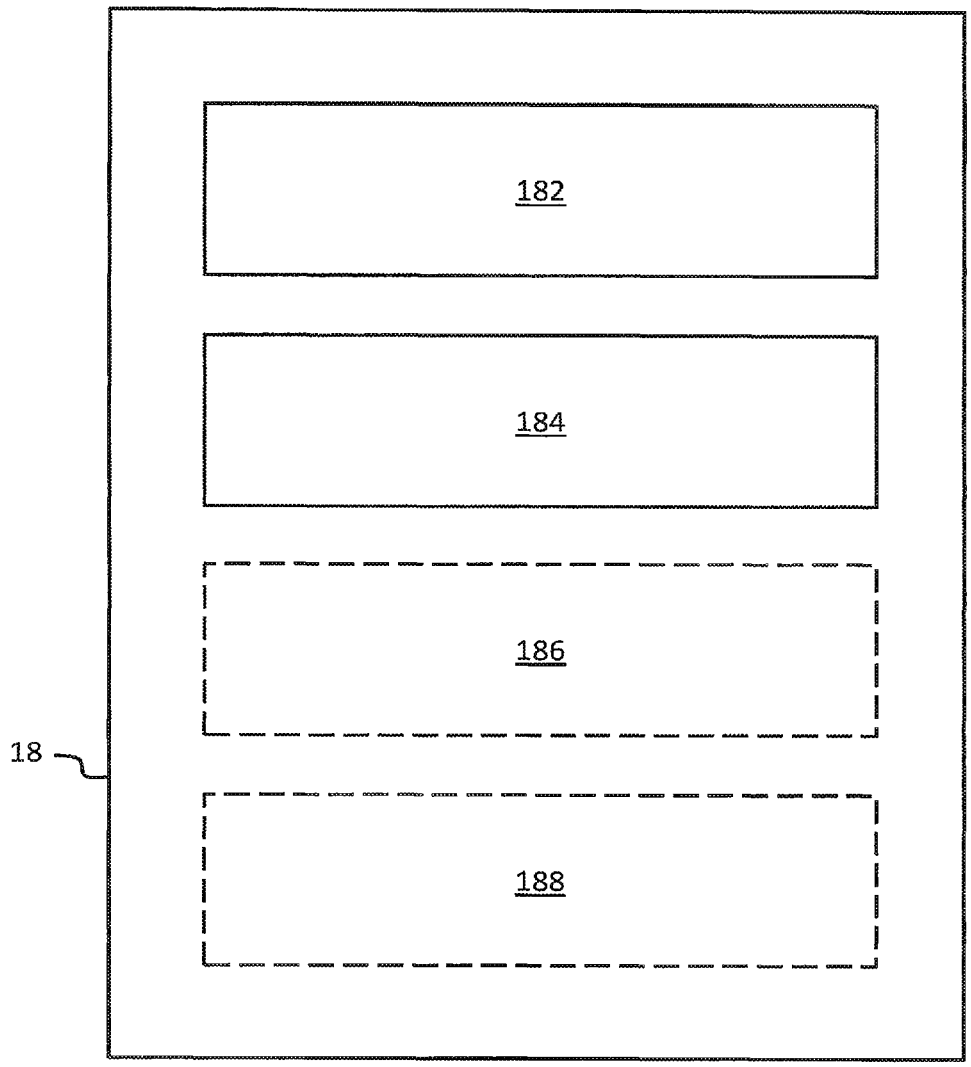
FIG. 2 diagrammatically illustrates an embodiment of the mobile robot according to the invention.

In the example of FIG. 2, the mobile robot 18 comprises an entry module 182, a distributor 184 for at least one locking means 184A, a communication module 186 and a video acquisition module 188.

The entry module 182 is configured to allow a user to enter information relative to the location of a box 14 and to send all or part of that information to a manager of the self-storage site 10 via the communication module 186, the second communication link L2 and the management module 20, successively. Preferably, the entry module 182 assumes the form of a tablet, preferably touch-sensitive, connected to the communication module 186.

The distributor 184 is configured to deliver a locking means 24A to a user once the latter has entered into a rental agreement for a box 14 via the entry module 182. The distributor 184 can assume the form of a carousel mounted in the body of the mobile robot 18.

The locking means 184A makes it possible to lock a box 14 of the site 10. Such a locking means 184A can for example assume the form of a padlock. Alternatively or additionally, the locking means 184A can assume the form of an electronic locking unit or any other suitable means.

The communication module 186 is configured to communicate remotely with a manager of the self-storage site 10, in particular so that the manager steers the mobile robot 18 remotely, receives information entered by a user on the entry module 182 and commands the distribution of a locking means 184A by the distributor 184.

To that end, the communication module 186 can comprise a display screen for displaying a video stream received from the management module 20 via the second communication link L2, and optionally a microphone allowing a voice communication between the manager and a user. The screen can advantageously be arranged at a height of about 150 cm so as to be able to dialogue with a user standing upright.

Advantageously, the communication module 186 may further be configured to communicate with an operator or a user of the self-storage site 10 via the first communication link L1 and the mobile user equipment 40. To that end and as an example, the communication module 186 can implement an application server able to communicate with an application installed on an item of mobile user equipment 40.

The video acquisition module 188 is configured to capture a plurality of images of the inside space INT and send them to the manager of the self-storage site 10 via the communication module 186 and the second communication link L2. Advantageously, the video acquisition module 188 comprises one or several video cameras.

For example, the video acquisition module 188 can comprise a first camera, situated in front of the mobile robot 18 and making it possible to film the visitor and photograph the items and documents necessary to enter into the box rental agreement 14, and a second camera situated at the back of the robot 18 making it possible to film the environment behind the robot 18.

It will be noted that advantageously, the entry module 182, the communication module 186 and the video acquisition module 188 can be implemented by a same entity, for example a tablet, preferably touch-sensitive.

In one preferred embodiment, the mobile robot 18 further comprises recharging means (not shown) configured to make it possible to recharge the mobile robot 18 with electricity on the recharging base 19, for example by electric contactors or by induction.

The mobile robot 18 may also comprise an on/off button (ON/OFF), a standby button making it possible to place the mobile robot 18 in standby mode, a call button allowing a visitor to indicate his presence on the site 10 to the manager, etc.

c) Recharging Base 19

The recharging base 19 makes it possible to recharge the mobile robot 18 with electricity. To that end, the recharging base 19 can for example comprise recharging means by electric contactors or by induction. Such means being known by those skilled in the art, they will not be outlined in further detail here.

2) Management Module 20

The management module 20 is commanded by a manager (or remote operator) so as in particular to steer the mobile robot 18 remotely, receive information entered by a user on the entry module 182, command the distribution of a locking means 184A by the distributor 184, receive images of the inside space INT acquired by the acquisition module 188 and remotely authorize the unlocking of the door of the access portal 16.

The management module 20 is configured to communicate with the access portal 16 via the third communication link L3 and with the mobile robot 18 over the second communication link L2.

Figure 3:
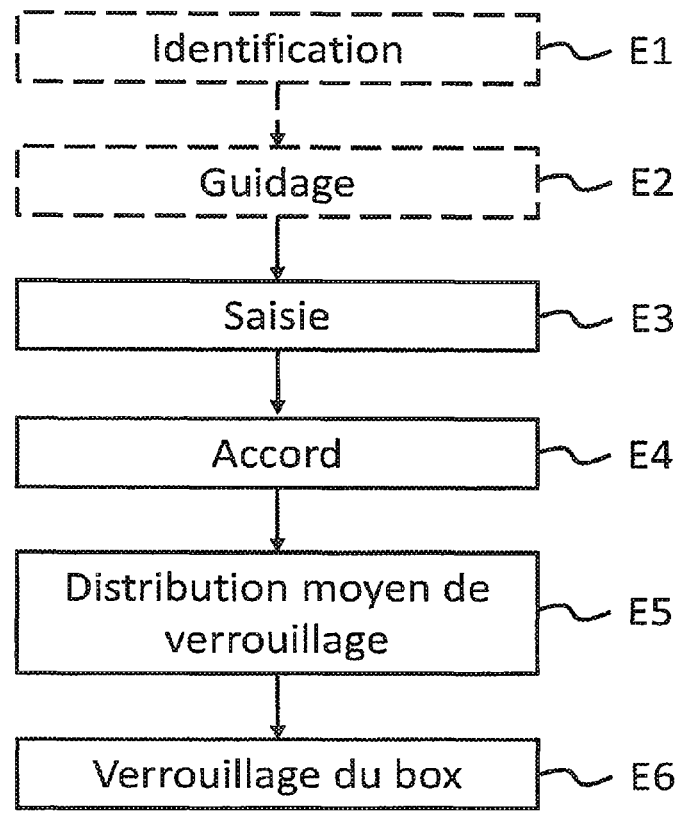
FIG. 3 diagrammatically illustrates an embodiment of a first method according to the invention.

The invention will now be described in its embodiment in reference to FIGS. 3 and 4.

II. Implementation of the Invention

In this example embodiment, the entry module 182 comprises a touch-sensitive tablet and the communication module 186 comprises a display screen, for example of the LCD type.

When a potential customer presents himself to the access portal 16, he actuates the videophone 16B in order to communicate remotely with the manager via the third communication link L3 of the communication network 30 and the management module 20. The manager and the customer then exchange identification information for the potential customer, for example relative to his national ID card or his passport, still via the videophone 16B so that the manager identifies the potential customer, in a step E1.

Once he has entered the inside space INT of the site 10, the potential customer indicates his presence to the mobile robot 18, for example by activating the touch-sensitive tablet of the entry module 182. It will be noted that, when the robot 18 is not in communication, an introductory film may be displayed on the display screen of the communication module 186 or on the touch-sensitive tablet of the entry module 182.

Once he has activated the touch-sensitive screen of the entry module 182 and optionally indicated, via said touch-sensitive tablet, that he wishes to rent a box 14, the potential customer is guided, in a step E2, by the mobile robot 18 in the inside space INT in order to visit the site 10 and select a box 14.

This guiding can be done autonomously by the mobile robot 18 or remotely by the manager, who can steer the mobile robot 18 remotely, in particular using images acquired in real-time by the acquisition module 188 of the mobile robot 18.

Once a box 14 is selected, the potential customer indicates his desire to enter into a rental agreement for said box 14 using the touch-sensitive tablet. A video recording may be started so that the potential customer can converse with the manager in order to enter into the agreement.

The manager may be called upon to perform inspection or collection operations for identification or documents (payment information, bank identification statement, proof of residence, etc.), which may for example be photographed using the camera of the video acquisition module 188.

In a step E3, the potential customer enters information via the touch-sensitive tablet, for example to perform an electronic signature of the contract.

When the rental agreement has been signed by the potential customer with the agreement of the manager, in a step E4, the manager sends a control message to the mobile robot 18 so that it distributes, via the distributor 184, in a step E5, a locking means 184A to the potential customer so that he can then store his objects in the box 14 that he has rented and lock it in a step E6.

When the mobile robot 18 detects that its battery level is low, it may autonomously steer itself toward the recharging base 18 or inform the manager, who steers it to the recharging base 19.

Optionally, it will be noted that the delivery of a locking means 24A by the mobile robot 18 can be done on request by an existing customer or a visitor without needing to enter into a box rental agreement 14, for example by activating a delivery function of the touchscreen, optionally accompanied by an entry of identification and/or payment information.

When it is not used by a visitor, the mobile robot 18 can monitor the site 10 to ensure the security thereof by moving in the inside space INT autonomously, or by being steered remotely by the manager.

Figure 4:
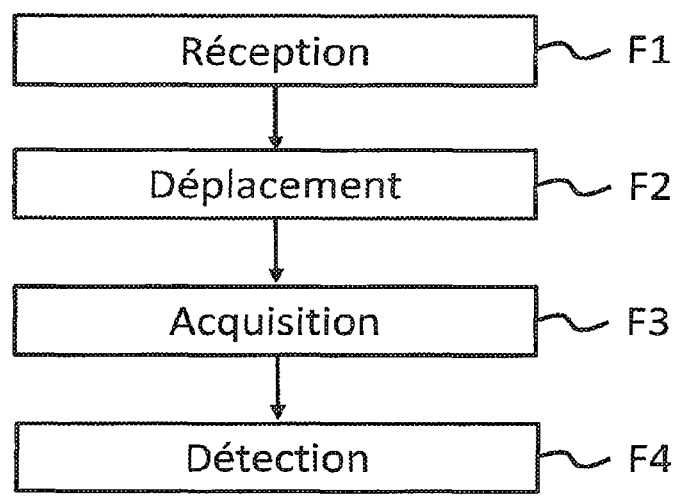
FIG. 4 diagrammatically illustrates an embodiment of a second method according to the invention.

In reference to FIG. 4, when the boxes 14 are equipped with an alarm, the triggering of an alarm of a box 14 of the self-storage site 10 can be communicated to the mobile robot 18, automatically or by the manager via its communication module 186, in a step F1, and drive its movement, in a step F2, into the inside space INT up to said box 14, then the acquisition of a plurality of images of the box in a step F3.

The mobile robot 18 can next send these images to the manager, who detects, or does not detect, an intrusion in step F4. Once it has arrived in front of the box 14 whereof the alarm was triggered, the mobile robot 18 can also ask the individual who triggered the alarm to identify himself via the entry module 182 in order to communicate alarm stop information to the manager or directly to the alarm system.

Lastly, it will be noted that a user, for example a manager, could control the mobile robot 18 via the item of user equipment 14 and the first communication link L1.

It should be noted that the present invention is not limited to the examples described above and is open to many alternatives accessible to those skilled in the art.

The invention claimed is:

1. A mobile robot usable inside a self-storage site comprising a plurality of outer walls defining an inside space and a plurality of storage boxes arranged in said inside space, said mobile robot comprising:
  an entry module including a display and input device that is configured to allow a user to enter information relative to a location of a first storage box, and
  a distributor housed in a body of the mobile robot storing at least one locking means that is configured to provide the at least one locking means to the user to lock said first storage box in response to the first storage box being rented.

2. The mobile robot according to claim 1, further comprising a communication module configured to communicate remotely with a manager of the self-storage site.

3. The mobile robot according to claim 2, wherein the entry module is configured to send information, entered by the user, to the manager of the self-storage site via the communication module in order to allow the manager to sign a rental agreement.

4. The mobile robot according to claim 2, further comprising a video acquisition module including an image capture device configured to capture a plurality of images of the inside space and send the plurality of images to the manager of the self-storage site via the communication module.

5. An automated self-storage site, said self-storage site comprising:
  a mobile robot according to claim 1,
  a plurality of outer walls defining an inside space in which the mobile robot is able to move, and
  a plurality of storage boxes arranged in said inside space, each of the plurality of storage boxes being able to be locked by a locking means distributed by the mobile robot.

6. An automated management system for a self-storage site, said system comprising a self-storage site according to claim 5 and a management module for the self-storage site configured to communicate, via a communication link, with the mobile robot via a remote communication module, to steer the mobile robot remotely or to share information relative to the location of one of the plurality of storage boxes with the user located in the inside space of the self-storage site via the mobile robot.

7. The system according to claim 6, wherein the management module is configured to send the mobile robot a control message authorizing the mobile robot to distribute the at least one locking means to the user.

8. A method for renting a box of a self-storage site via a mobile robot according to claim 1, said self-storage site comprising a plurality of outer walls defining an inside space and a plurality of storage boxes arranged in said inside space, said method comprising:
  receiving information relative to a rental agreement for one of the plurality of storage box of the site via the entry module of the mobile robot,
  distributing a locking means via the locking means distributor of the mobile robot in response to the rental agreement being signed, and
  locking the box using the distributed locking means.

9. The method according to claim 8, the mobile robot comprising a communication module configured to communicate remotely with a manager of the self-storage site, the method comprises sending information, received from the user via the entry module, to the manager of the self-storage site using said communication module, and receiving from the manager via the communication module, a control message authorizing the mobile robot to distribute a locking means to a user once the agreement is signed.

10. The method according to claim 8, comprising a step of guiding the user via the mobile robot in the inside space of the site in order to select a free box to be rented from among the plurality of boxes.

11. A mobile robot usable inside a self-storage site comprising a plurality of outer walls defining an inside space and a plurality of storage boxes arranged in said inside space, said mobile robot comprising:
  a display with an interactive screen that is configured to allow a user to enter information relative to rental agreement for a first storage box, and
  a carousel in the body of the mobile robot storing a lock that is configured to provide the lock to the user to lock said first storage box in response to the first storage box being rented.

12. The mobile robot according to claim 11, further comprising a communication module configured to communicate remotely with a management system of the self-storage site.

13. The mobile robot according to claim 12, wherein the entry module is configured to send information, entered by the user, to the manager of the self-storage site via the communication module in order to allow the manager to sign the-rental agreement.

14. The mobile robot according to claim 12, further comprising an image capture device configured to capture a plurality of images of the inside space and send the plurality of images to the manager of the self-storage site via the communication module.

* * * * *